United States Patent Office 2,942,318
Patented June 28, 1960

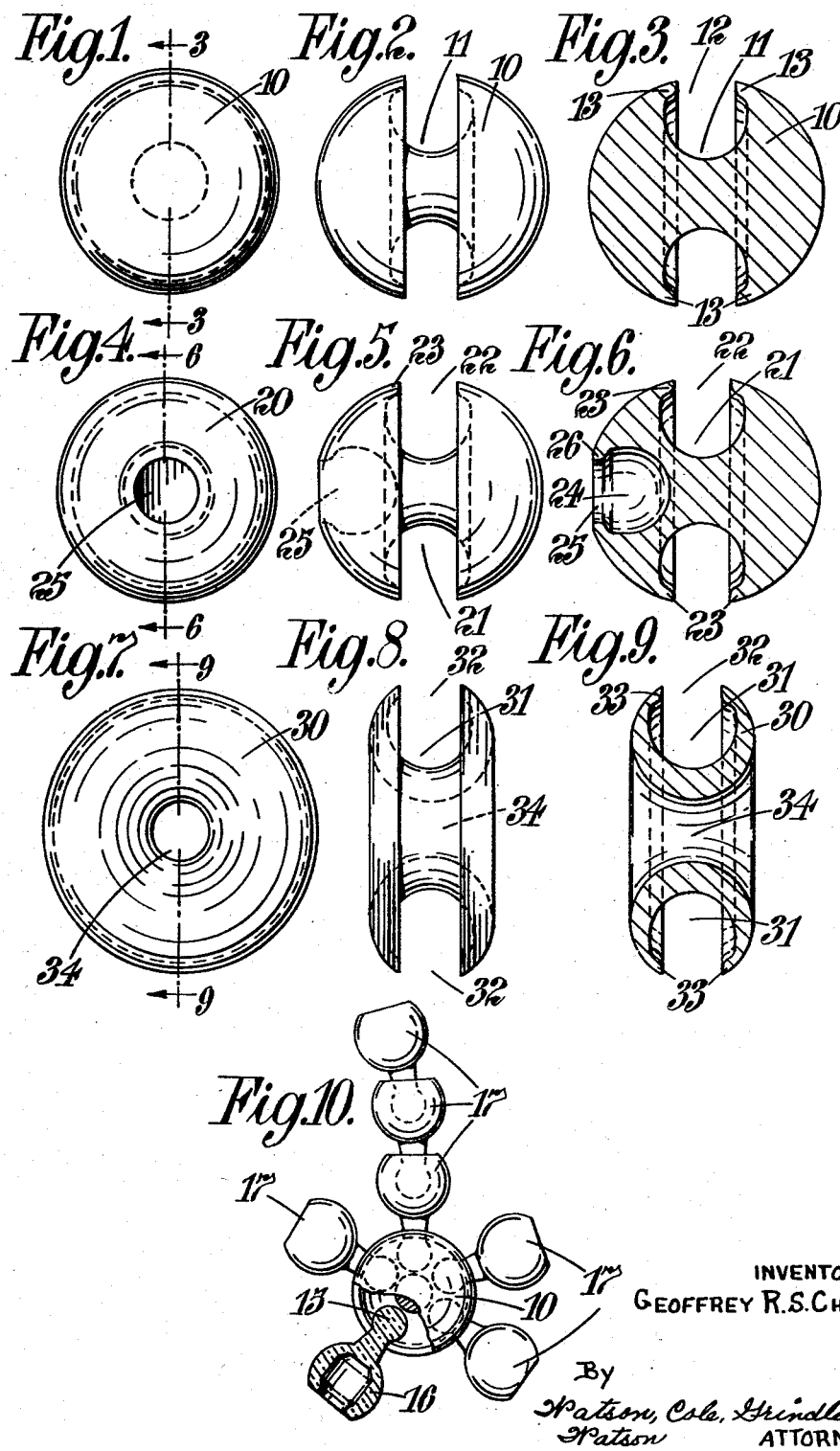

2,942,318

ORNAMENTAL BEADS

Geoffrey Russell Stafford Charles, Marlow, England, assignor to Chelton (Poppits) Limited, Marlow, England, a British company Filed Sept. 24, 1956, Ser. No. 611,653

Claims priority, application Great Britain May 31, 1956

11 Claims. (Cl. 24—213)

There is described in Patent No. 2,714,269 granted August 2, 1955 and entitled "Ornamental Beaded Necklace" a construction of ornamental beads in which the beads are formed of resilient plastic material, a neck carrying a head being provided on one bead, which head can be forced into a socket on another bead, the socket having a mouth of smaller cross-section than the socket interior and the head of one bead and the mouth on the other being so shaped and dimensioned in relation to one another that the head will not ordinarily pass through the mouth but, due to the resilience of the plastic material, can be forced through with a snap action when it is desired to join the two beads together.

The present invention relates to a link unit which may be used in joining together two or more such beads.

According to this invention, a link unit for joining together beads of the kind formed of resilient plastic material and having a head on the end of a neck, comprises a body formed of resilient plastic material, for example polythene, having a slot or groove with inwardly directed lips such that the head of a bead can be forced into the slot or groove by resilient deformation of the lips and/or of the head so as to be slidably retained therein. This link unit thus permits of several beads all being joined to a single link unit. The link unit might be used, for example, as part of necklace formed of beads such as are described in the aforementioned specification to enable one or more pendant beads to be attached to the necklace or as a common link unit in two or more chains of beads.

The invention also includes within its scope the combination, with one or more beads of the kind formed of resilient plastic material and having a head on the end of a neck, of a link unit comprising a body formed of resilient plastic material having a slot or groove with inwardly directed lips such that the head of a bead can be forced into the slot or groove by resilient deformation of the lips and/or of the head so as to be slidably retained therein.

In one arrangement the link unit is formed as a body with said slot or groove extending as an endless groove around the periphery. In this case conveniently the periphery of the link unit is of circular form and may, for example, be a solid body with convex surfaces on either side of the groove. In another construction, the link unit is formed as a body with a central hole extending through the body at right angles to the plane of the endless groove. One or more sockets, similar to the sockets in beads of the type described above, may be provided in the link unit so that a bead or the like may be connected to one face of the link unit in addition to the other beads which may be joined to the link unit by having their heads forced into the slot or groove.

If the link unit is to be used for completing an endless chain of beads, the beads on either side of the link unit must have heads for insertion in the link unit and use may be made of beads having two heads as described in the aforementioned Patent No. 2,7142,269 in which it is explained that a necklace may be constructed with beads having two heads arranged alternatively with beads having two sockets. Another method of providing a double headed bead is to combine a bead having a head and a socket with a link formed of a neck with two heads, one at each end, also as described in the aforementioned Patent No. 2,714,269. Such a double-headed link may be inserted in a socket of a socketed bead to provide a protruding head.

The following is a description of a number of embodiments of the invention, reference being made to the accompanying drawings in which:

Figure 1 is a side elevation of a link unit for joining together plastic beads;

Figure 2 is an end elevation of the unit shown in Figure 1;

Figure 3 is a sectional view along the line 3—3 of Figure 1;

Figures 4 and 5 are views similar to Figures 1 and 2 of a second embodiment of the invention;

Figure 6 is a section along the line 6—6 of Figure 4;

Figures 7 and 8 are views similar to Figures 1 and 2 of a third embodiment of the invention;

Figure 9 is a section along the line 9—9 of Figure 7, and

Figure 10 is a view in elevation on a smaller scale showing the combination of the link unit of Figures 1 to 3 with a number of beads.

Figures 1 to 3 show a form of link unit for use with plastic beads of the kind, such as is described and claimed in Patent No. 2,714,269, having a neck carrying a head, the head on one bead being capable of being forced into the socket on another bead, and the socket having a mouth of smaller cross-section than the socket interior and the head and mouth being so shaped and dimensioned in relation to one another that the head will not ordinarily pass through the mouth, but, due to the resilience of the plastic material, can be forced through the mouth with a snap action when it is desired to join two beads together. Usually each bead is provided with both a head and a socket so that a number of beads can be joined together to form a chain, for use, for example, as a necklace or bracelet. Such a chain may also be formed by double-headed beads arranged alternatively with beads having two sockets or by socketed beads in combination with links formed of two heads joined together by a neck. Referring to Figures 1 to 3, there is shown a link unit for joining together a number of beads. This link unit is formed as a moulding of polythene and comprises a body 10 of generally spherical form with an endless groove 11 extending around its periphery. The groove in section, as seen in Figure 3, has a narrow mouth 12 formed by inwardly directed lips 13, the mouth leading into a wider interior portion of the groove. As shown in Figure 10, the head 15 of a plastic bead 16 may be forced into this groove so that the bead is slidable along the groove. This link unit may thus be used for attaching together a number of beads, for example the beads 17, to form an ornamental combination.

The link unit illustrated in Figures 4 to 6 is generally similar to the link unit of Figures 1 to 3 and comprises a moulded polythene body portion 20 having an endless peripheral groove 21, the groove having a narrow mouth 22 formed by inwardly directed lips 23. In one face of the link unit shown in Figures 4 to 6 there is formed a socket 24 which is shaped similarly to the sockets in the beads with which the link unit is to be used and has a narrow mouth 25 with an inwardly directed peripheral lip 26. This socket is so shaped and dimensioned with respect to the heads on the beads that a head may be forced into the socket with a snap action by resilient deformation of the head and/or the mouth when it is desired to secure a bead to the socket 24 of the link unit. It will thus be seen that the unit of Figures 4 to 6 can be used in a similar manner to the unit of Figures 1 to 3 but that it also permits of the fixing of a bead or other ornamental device onto one face of the link unit.

The link unit shown in Figures 7 to 9 comprises an annular body 30 moulded from polythene and having a peripheral groove in its outer face, this groove having a narrow mouth 32 formed by the inwardly directed lips 33. The arrangement of Figures 7 to 9 has a central bore 34 but, apart from the difference in appearance, it may be used in the same way as the link unit of Figures 1 to 3.

Although all the arrangements shown in Figures 1 to 9 have an endless peripheral groove, it may be preferred in some cases to have an interrupted groove in the form of a series of slots spaced apart end to end, so making the unit more rigid.

I claim:

1. The combination with at least one bead of the kind formed of resilient plastic material and having a head on the end of a neck, of a link unit comprising a body formed of resilient plastic material having an endless slot of uniform section extending around the periphery of the body facing radially outwardly therefrom and with lips along the edges of the slot such that the head of a bead can be forced into the slot so as to be slidable along the slot but retained therein.

2. The combination, with at least one bead of the kind formed of resilient plastic material and having a head on the end of a neck, of a link unit comprising a spherical body formed of resilient plastic material having an endless groove of uniform section extending around the body in a diametral plane, the groove having lips directed towards one another and extending continuously along the groove such that the head of a bead can be forced into the groove by resilient deformation of the lips so as to be slidably retained in the groove.

3. The combination, with at least one bead of the kind formed of resilient plastic material and having a head on the end of a neck, of a link unit comprising a toroidal body formed of resilient plastic material having an endless groove of uniform section extending around the outer periphery of the body in a plane through the section of maximum diameter, the groove having lips directed towards one another and extending continuously along the groove such that the head of a bead can be forced into the groove by resilient deformation of the lips so as to be slidably retained in the groove.

4. The combination as claimed in claim 1 wherein said body is formed of polythene.

5. The combination as claimed in claim 1 wherein the periphery is of circular form.

6. The combination as claimed in claim 5 wherein the body is solid with convex surfaces on either side of the groove.

7. The combination as claimed in claim 5 wherein the body is formed with a central hole extending through the body at right angles to the plane of the endless groove.

8. The combination with at least one bead of the kind formed of resilient plastic material and having a head on the end of a neck, of a link unit comprising a body formed of resilient plastic material having a slot extending at least partly around the peripheral surface of said body with inwardly directed lips, the slot and the head of the bead being so shaped and dimensioned that the head can be forced into the slot by resilient deformation of the lips and/or the head so as to be slidably retained therein.

9. The combination as claimed in claim 8 wherein the link unit is formed with at least one socket, having a mouth of smaller cross-section than the socket interior, the mouth being so shaped and dimensioned in relation to the head of a bead that the head will not ordinarily pass through the mouth but, due to the resilience of the plastic material, can be forced through with a snap action when it is desired to join a bead to the link unit utilising the socket.

10. The combination, with at least one bead of the kind formed of resilient plastic material and having a head on the end of a neck, of a link unit comprising a body formed of resilient plastic material having an endless groove of uniform section extending around the surface of said body, said groove having inwardly directed lips such that the head of a bead can be forced into the groove by resilient deformation of the lips and/or of the head so as to be slidably retained therein.

11. The combination as claimed in claim 10 wherein said body is formed of polythene.

References Cited in the file of this patent

UNITED STATES PATENTS

| | | |
|---|---|---|
| 1,259,388 | Gagnon | Mar. 12, 1918 |
| 1,485,724 | Scully | Mar. 4, 1924 |
| 2,178,055 | Stupell | Oct. 31, 1939 |
| 2,714,269 | Charles | Aug. 2, 1955 |

FOREIGN PATENTS

| | | |
|---|---|---|
| 539,764 | Germany | Mar. 26, 1932 |
| 539,996 | Germany | Mar. 26, 1932 |